(12) United States Patent
Barragy et al.

(10) Patent No.: US 7,308,571 B2
(45) Date of Patent: Dec. 11, 2007

(54) OVERRIDING PROCESSOR CONFIGURATION SETTINGS

(75) Inventors: Edward Barragy, Austin, TX (US); Chris J. Newburn, Beloit, IL (US)

(73) Assignee: Intel Corporation, Santa Clara, CA (US)

( * ) Notice: Subject to any disclaimer, the term of this patent is extended or adjusted under 35 U.S.C. 154(b) by 372 days.

(21) Appl. No.: 10/959,356

(22) Filed: Oct. 6, 2004

(65) Prior Publication Data

US 2006/0075218 A1 Apr. 6, 2006

(51) Int. Cl.
G06F 1/24 (2006.01)
(52) U.S. Cl. .................................................. 713/100
(58) Field of Classification Search ............... 713/1, 713/100
See application file for complete search history.

(56) References Cited

U.S. PATENT DOCUMENTS

| 5,606,715 | A | | 2/1997 | Yishay et al. | |
|---|---|---|---|---|---|
| 5,671,435 | A | * | 9/1997 | Alpert | 712/38 |
| 5,732,207 | A | * | 3/1998 | Allen et al. | 714/5 |
| 5,854,913 | A | * | 12/1998 | Goetz et al. | 712/210 |
| 5,889,679 | A | * | 3/1999 | Henry et al. | 716/17 |
| 6,574,712 | B1 | | 6/2003 | Kahle et al. | |
| 6,615,344 | B1 | * | 9/2003 | Hagen | 713/1 |
| 6,662,274 | B2 | | 12/2003 | Subramoney et al. | 711/137 |
| 6,675,263 | B2 | | 1/2004 | Anderson et al. | 711/137 |
| 6,675,280 | B2 | | 1/2004 | Cooksey et al. | 711/204 |

FOREIGN PATENT DOCUMENTS

EP 0 218 335 4/1987

\* cited by examiner

*Primary Examiner*—Rehana Perveen
*Assistant Examiner*—Eric Chang
(74) *Attorney, Agent, or Firm*—Trop, Pruner & Hu, P.C.

(57) ABSTRACT

In one embodiment, the present invention includes a method for setting an entry in an override register corresponding to a processor feature to override a processor configuration setting for the processor feature and overriding the processor configuration setting for the processor feature using the entry. The entry may be set with a user-level application, for example.

3 Claims, 6 Drawing Sheets

OVERRIDING PROCESSOR CONFIGURATION SETTINGS

BACKGROUND

The present invention relates to processor-based systems and more specifically to overriding processor configuration settings of processor features.

A processor, such as a central processing unit (CPU) of a system typically includes a number of processor features such as caches, buffers, arrays, and the like. The processor may further include various processor features that are logic units, such as a branch prediction unit, and a prefetch unit, among others. One way in which the performance of a processor is improved is through the use of a multiple-stage pipeline architecture, in which various pipeline features may be used to more efficiently execute instructions.

For the processor to perform instructions efficiently, certain features within the processor may be defaulted to an enabled or disabled state during the manufacture of the processor. Typically, this default state cannot be modified under user-level control. That is, certain processor features are enabled or disabled by default when the processor is manufactured, with different default configurations possible for different target markets. In other words, current practice is 'all or nothing', irrespective of the application executing on the processor. Thus, certain processor features are enabled or disabled according to a predetermined policy, typically determined before the system is shipped to an end user.

For example, a hardware prefetcher of a processor is typically configured to a default condition during manufacture. This default condition is set when a system including the processor is booted, for example, during basic input/output system (BIOS) execution. Thus control of the hardware prefetcher is not visible to an end user and cannot be reconfigured by the end user.

A need thus exists to improve processor performance with regard to particular processor features.

DETAILED DESCRIPTION

In various embodiments, user-level software control of different aspects of a processor's micro-architectural configuration may be effected. While such user-level control may be achieved in many different ways, in certain embodiments one or more additional registers may be present within a processor to store information regarding the processor's configuration. In one embodiment, the additional register may be referred to as a micro-architectural configuration register, or MCR. As part of the processor's state, the MCR is saved and restored across context switches. In certain embodiments, each bit in the MCR may correspond to an enabled or disabled condition of a specific micro-architectural feature. As an additional register, reading and writing of the MCR is very fast, and is comparable in speed to modifying of general purpose (GP) registers within the processor.

Figure 1:
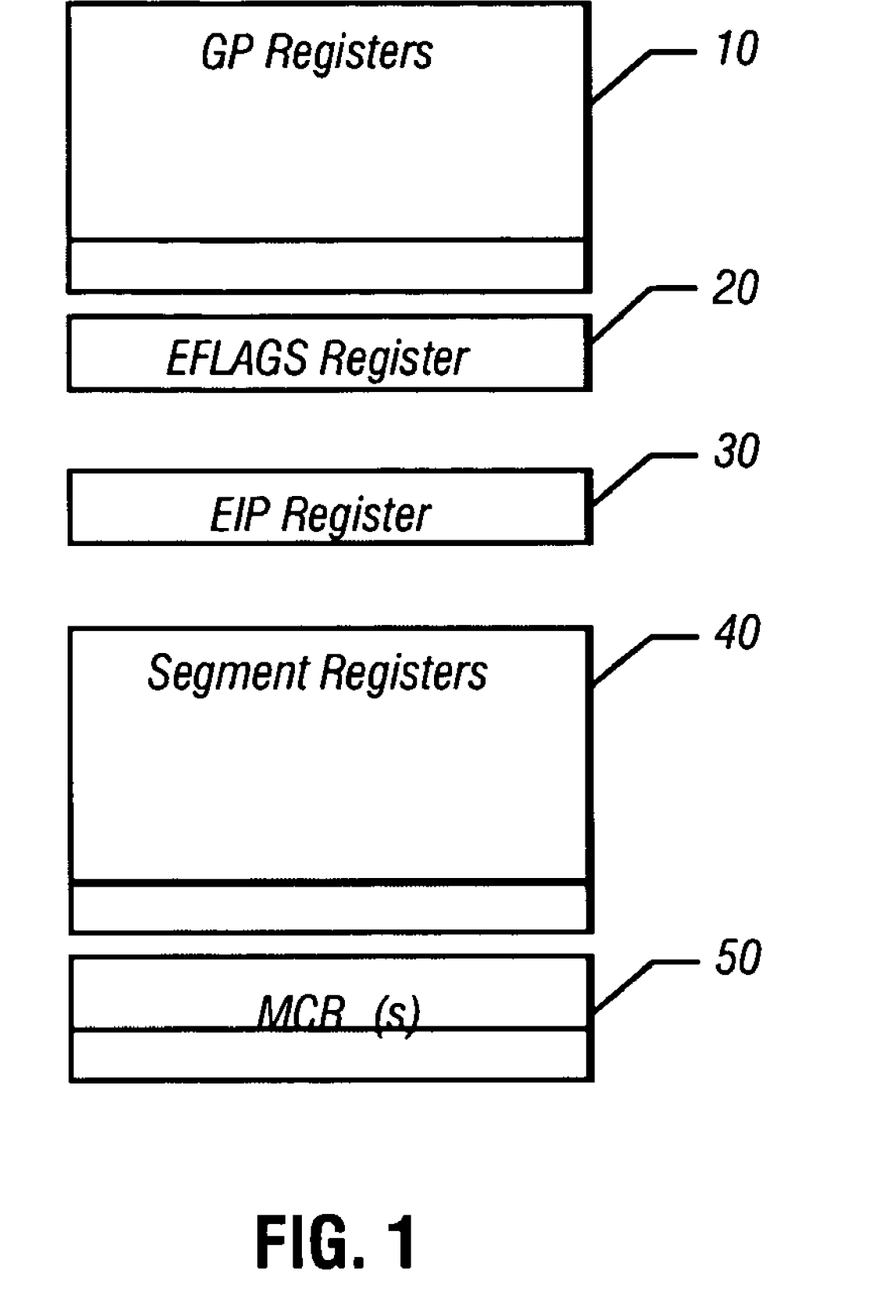
FIG. 1 is a block diagram of a partial set of state registers of a processor in accordance with one embodiment of the present invention.

Referring now to FIG. 1, shown is a block diagram of a partial set of state registers in a processor in accordance with one embodiment of the present invention. The state registers of FIG. 1 may be present in a processor in accordance with an Intel® architecture (IA-32 or x86) specification, although the scope of the present invention is not so limited. That is, while discussed primarily herein with reference to an IA-32 processor, embodiments may be implemented in other processors available from Intel Corporation such as an ITANIUM® processor, or processors of other manufacturers having a similar or different instruction set architecture (ISA). As shown in FIG. 1, the state registers may be within a core of a processor and may be used to store information regarding processor state for a given context. While shown with the specific registers present in FIG. 1, it is to be understood that in other embodiments, additional status, control and state registers may be present, in addition to other program execution registers.

As shown in FIG. 1, registers present may include a plurality of GP registers 10. Such registers may be used to store various information during processor operation, such as operands for logical and arithmetic operations, operands for address calculations, memory pointers, and the like. Additionally, status and control (EFLAGS) register 20 may include various status flags, control flags, and system flags. EFLAGS register 20 may be used to report on program status. Instruction pointer (EIP) register 30 may be used to store a pointer to the next instruction of a program to be executed.

As further shown in FIG. 1, a plurality of segment registers 40 may be present. Segment registers 40 may store segment selectors which act as a pointer to identify a memory segment. In other words, such segment registers 40 address code, data and stack segments in memory.

As further shown in FIG. 1, at least one micro-architectural configuration register (MCR) 50 is present. MCR 50 may be used to store information regarding different processor features. For example, each entry or bit of MCR 50 may correspond to a different processor feature. MCR 50 may be architecturally visible, such that it may be accessed by various software levels via the ISA. The outputs of each bit may be coupled to a corresponding feature or other processor hardware to control the enabling or disabling of the feature. Based on the status of the given bit, the corresponding feature may be enabled or disabled.

As an example, certain features may be enabled or disabled by default when a processor is manufactured. However, during operation, certain features may have their default setting changed (e.g., enabled to disabled) under software control. Such software control may be effected in user-level software, such as an application program. In such manner, non-operating system (OS) or non-BIOS control of processor features may be effected.

Collectively, the registers shown in FIG. 1, along with other registers not shown in FIG. 1, such as architectural control registers (e.g., control register 0, control register 1, control register 2, control register 3, and the like), may be considered to be context registers, as such registers may be programmed with different values based on a given context that is running on the processor. A context switch may occur when a multitasking OS stops running one process (e.g., an application or a software thread) and begins running another. Upon a context switch, the values stored in these registers may be saved away to save the processor state for the current context. Then these registers may be loaded with the status for the new context to provide its processor state. On another context switch, e.g., back to the original context, the saved processor state may be restored to the registers.

Certain processor features may be appropriate or inappropriate during a given program phase. Accordingly, in operation, bits of MCR 50 may be enabled or disabled based on information regarding the utility, efficiency and the like of a particular processor feature for a given application. For example, either via a predetermined policy, dynamic profiling, or during specific program phases it is known that enabling or disabling a specific feature improves overall program performance. Software may determine the appropriateness of overriding a processor configuration setting and cause enabling or disabling of processor features in various manners. First, when software such as an application program is written, a programmer may insert code to cause the desired feature to be turned on or off (i.e., enabled or disabled) at certain phases of a program. In other embodiments, a compiler may determine that a particular processor feature is desired for certain program phases and during compilation may insert code to cause the desired enabling or disabling of one or more processor features. Still further, in a managed runtime environment (MRTE) (e.g., a Java™ or .NET environment), profiling may be performed and the results of the profiling may indicate that certain processor features are appropriate during certain program phases, but are inappropriate during other phases.

Upon entering the first program phase, the appropriate bit of MCR 50 (for example) is set to either enable or disable the specified feature. Upon exiting of this program phase, the MCR bit is reset to its original value. Because the contents of MCR 50 is part of the processor state and is preserved across context switches, it is specific to a given software process and thread.

In other embodiments during dynamic profiling, it may be determined that when an application reaches a certain program counter (PC) value, a given feature is to be enabled or disabled. In still other embodiments, a given feature may be enabled or disabled for particular program types. For example, a hardware prefetcher (HWP) such as a striding hardware prefetcher may be enabled for a scientific computing application, while it may be disabled for a database application, as the mechanics of these different types of applications cause the prefetcher to be less effective for database operations.

While embodiments of the present invention may be used with a variety of micro-architectural or other processor features, the following discussion relates to a HWP. In the case of MRTE's for server-type applications a HWP may provide very large performance boosts during garbage collection (GC) phases of the computation but may hurt overall performance. Thus to improve performance, the HWP may be disabled during general phases of computation, but enabled during garbage collection. When a virtual machine (VM) of the MRTE enters a garbage collection phase, it accesses MCR 50 and sets a bit corresponding to the HWP configuration to 'enabled'. When the garbage collection phase is completed this bit is set to 'disabled'.

In other embodiments, a plurality of registers may be used to provide user-level control of processor features. In such manner, control of processor features, such as micro-architectural features, may support both a processor configuration setting that applies to all software threads by default, and hints by each software thread to override that default. Thus, a first register may be present to store information regarding default processor configuration settings and one or more override registers may be present for use by software to override the default setting. Then based on the information in the override registers, processor configuration settings may be overwritten by forcing a feature to be enabled or to be disabled.

Figure 2:
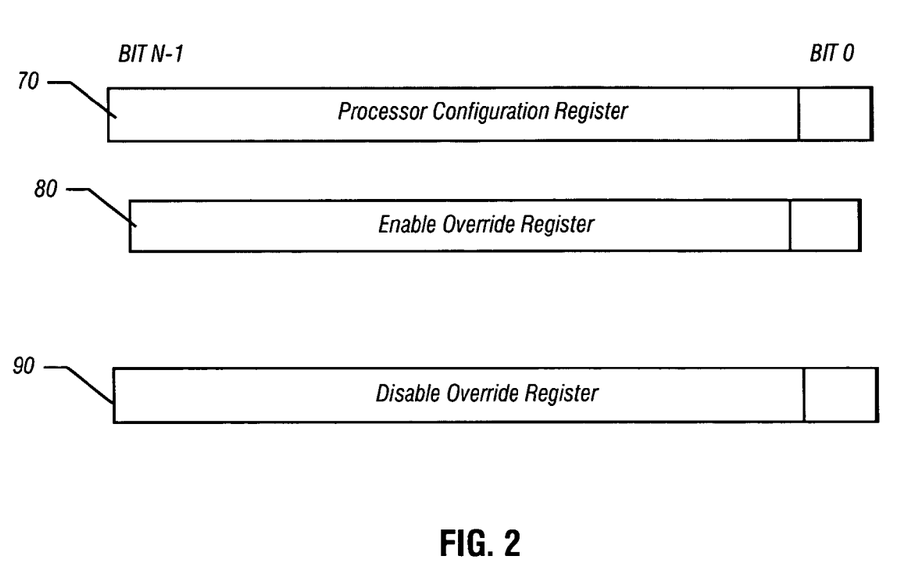
FIG. 2 is a block diagram of multiple override registers in accordance with another embodiment of the present invention.

Referring now to FIG. 2, shown is a block diagram of multiple registers in accordance with another embodiment of the present invention. As shown in FIG. 2, a processor configuration register (PCR) 70 is present. PCR 70 may include N bits, where each bit corresponds to a different processor feature, such as micro-architectural features and the like. PCR 70 may store values that correspond to a processor configuration setting, applicable as a default across all processes. For example, a value of 1 may indicate that the corresponding feature is enabled while a value of 0 may indicate that the corresponding feature is disabled.

However, the values in PCR 70 may be overwritten based on user-level control of a given software thread. Specifically, the default settings of PCR 70 may be overridden based on information in an enable override register (EOR) 80 and a disable override register (DOR) 90. EOR 80 and DOR 90 may be programmed during execution of a given software thread to override the default settings, and to cause a processor feature to be enabled or disabled. For example, an independent software vendor (ISV) developing an application program may include code to cause a particular processor feature to be enabled to improve operation and efficiency of the program, for example, during certain program phases.

In different embodiments, the corresponding bits of PCR 70, EOR 80 and DOR 90 may be logically combined in order to effect the desired disabling or enabling of a processor feature. The registers may be logically joined in different manners to effect feature selection under user control.

Figure 3:
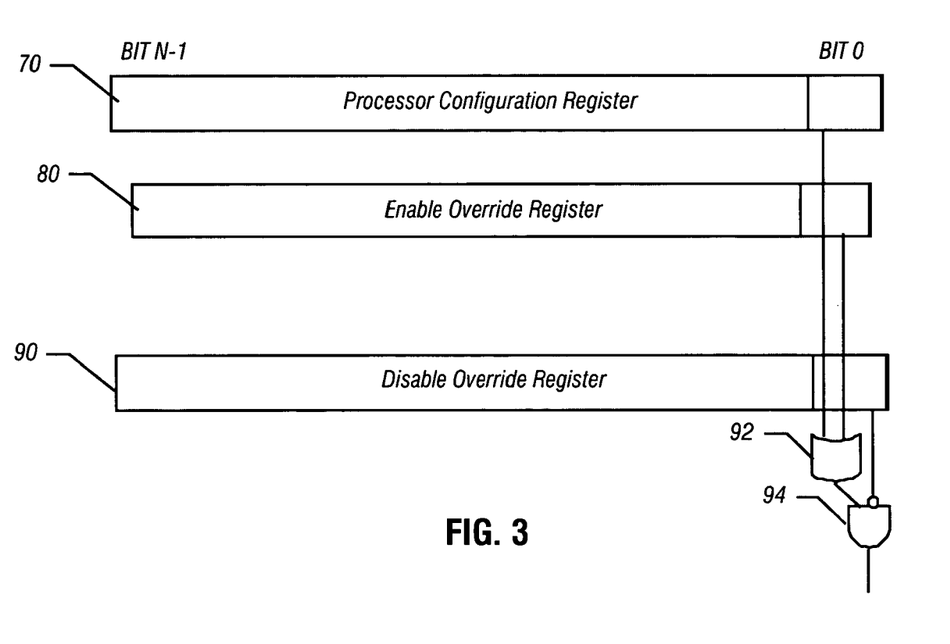
FIG. 3 is a logic implementation used to couple override registers in accordance with one embodiment of the present invention.

Referring now to FIG. 3, shown is a logic implementation used to couple override registers in accordance with one embodiment of the present invention. Specifically, FIG. 3 shows corresponding bits of PCR 70, EOR 80 and DOR 90. As further shown in FIG. 3, logic gates may be used to couple the corresponding bits. Specifically, an OR gate 92 may receive corresponding bits from PCR 70 and EOR 80. In turn, the output of OR gate 92 may be coupled to an input of an AND gate 94, which is also coupled to receive an inverted output of a corresponding bit of DOR 90. The resulting output of AND gate 94 may be used to control the processor configuration setting for the corresponding processor feature. For example, the output of AND gate 94 may be provided to circuitry of the processor feature to enable or disable the feature accordingly.

Using the logic implementation shown in FIG. 3, the combination of the bit settings for the three registers may cause associated processor features to be enabled or disabled. Specifically, under normal operating conditions without regard to EOR 80 and DOR 90, a value of 1 in bit 0 (for example) of PCR 70 indicates that the corresponding feature is enabled. A value of 1 in bit 0 of EOR 80 and DOR 90 indicates that the value of the PCR 70 is to be overridden, as enable and disable, respectively. That is, an active high value for a bit of EOR 80 is used to force the corresponding feature on, while an active high bit in DOR 90 is used to force the corresponding feature off.

For example, in a desktop system, a PCR bit corresponding to a HWP may be set to 1 'at the factory' (or by an original equipment manufacturer (OEM) via BIOS) so that the HWP is enabled by default. Because such a HWP may be desirable for an application running on the desktop system, the application (i.e., user-level) code does nothing with respect to the override registers and the corresponding bits of EOR 80 and DOR 90 are defaulted to 0. Thus the default behavior for the feature is given by the PCR bit, i.e., the HWP is enabled for the desktop system.

However for a server system, it may be desired to disable the HWP by default. In this case, the PCR bit corresponding to the HWP is set 'at the factory' to 0. For this default setting, the corresponding bits of EOR 80 and DOR 90 are 0, and thus the HWP is disabled by default. During execution of a program or certain portions of a program, it may be desired to enable the HWP. For example, a Java™ application may be running on the server system. Based on profiling, it is known that the HWP may improve performance during a GC phase, thus the HWP may be enabled during GC, but disabled elsewhere during the application. Because the HWP is off by default, during GC software sets the corresponding bit of EOR 80 to 1. The corresponding bit of DOR 90 remains at its default value of 0. Based on the logic implementation shown in FIG. 3, this gives a final output of 1 from AND gate 94 and the HWP is enabled, as desired.

Conversely, suppose the same Java™ application is running on a desktop system. Here the PCR bit is set at the factory to 1. Because the application runs more efficiently without the HWP enabled during non-GC phases, at the end of a GC phase, software sets the corresponding DOR bit to 1. This value of DOR 90 indicates a disable override, and the HWP is disabled. The application executes until the start of the next GC phase with the HWP disabled, at which point it resets the DOR bit to 0, which enables the HWP. Because the software sets the bits at the appropriate program locations, the save/restore cost at context switches may be reduced.

As discussed above, the software hint settings are software thread specific and may be saved and restored upon context switches. In designs in which a save and restore procedure is optimized to save only those settings which are not a logic 0, the override registers may only be set if they are useful. If the override bit would provide the same setting as the processor configuration setting, i.e., there is no need for an override (it is useless), then the corresponding override bit is not set. In such an embodiment, the input to the appropriate bits of EOR 80 and DOR 90 may be an output of logically ANDing the software-specified bit and the inverted value of the corresponding processor configuration setting bit. If the hardware does not support functionality associated with the software—specified bits, there is nothing to override, and they are useless. Accordingly, those bits may be read only, with values of 0.

In certain embodiments, hardware may override the software hint overrides. That is, based on certain information the hardware may determine that the software hint values do not improve program execution or are inappropriate for a given hardware implementation and therefore the hardware may override such software hints.

As a result, if the hardware can determine empirically that the setting suggested by the software hint override is not effective, then hardware can clear the override bit. For example, the hardware may first accept a software hint and execute an application accordingly. However, the hardware may determine that execution is not efficient and the enabled or disabled feature does not improve processor performance or may violate another type of execution constraint, such as a thermal limit. In such case, the hardware may choose to override the software hint. In other embodiments, the hardware may choose to override a software hint where it is already using the processor feature according to the hint value. Or it may choose to override the software hint in situations where the hardware has better control and understanding of the processor feature. A hardware override may be appropriate if the software suggests that the hardware should try a speculative optimization that has a large potential upside, but that might be costly to try, hence the responsibility of indicating the possibility of potential gain rests with software.

Figure 4:
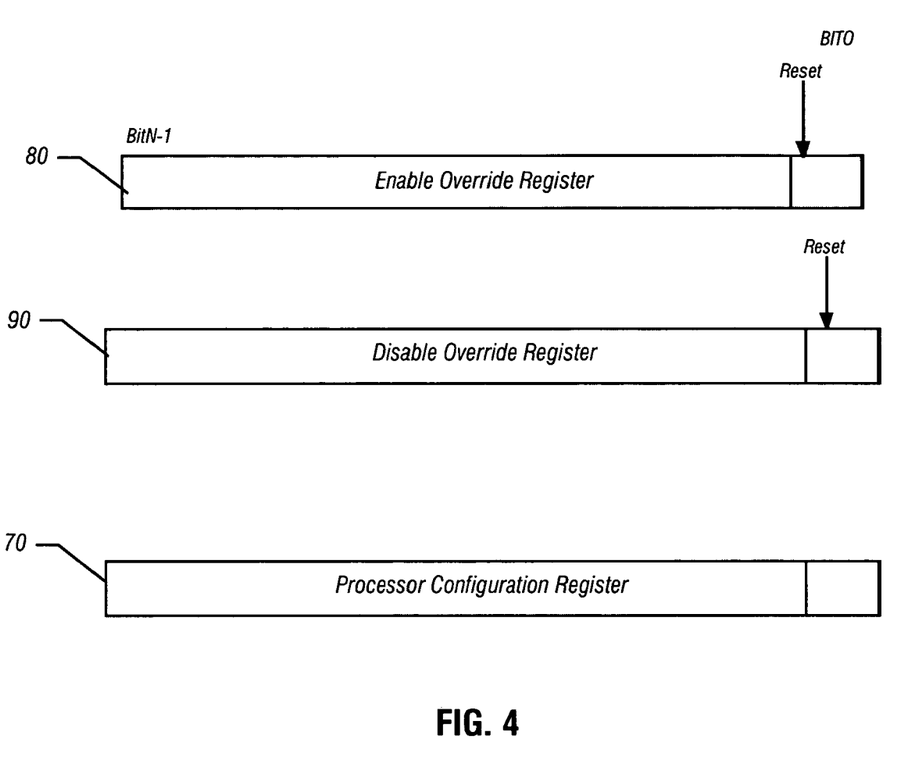
FIG. 4 is a block diagram of override registers in accordance with another embodiment of the present invention.

Referring now to FIG. 4, shown is a block diagram of override registers in accordance with another embodiment of the present invention. As shown in FIG. 4, a processor configuration register (PCR) 70, an enable override register (EOR) 80 and a disable override register (DOR) 90 may be present. In the embodiment of FIG. 4, the override registers may be configured to provide for hardware override of the software override registers. Specifically, as shown in FIG. 4, bits of EOR 80 and DOR 90 may receive a reset signal. This signal may be used to override a software-specified value for the corresponding bit.

For example, for a given processor feature, the corresponding bit of PCR 70 may be set at a default value of 0. However, an application desires to override that setting and cause the feature to be enabled. Accordingly, the software causes the corresponding bit of EOR 80 to be set at a value of 1. The corresponding bit of DOR 90 may remain set at a default of 0, which would cause the corresponding feature to be enabled using the logic implementation shown in FIG. 3. However, in an embodiment in which the hardware chooses to override the software specified value, the reset signal may be applied to the corresponding bit of EOR 80, causing the bit value to be returned to its default value of 0. In such manner, the hardware overrides the software hint. While shown as directly coupled to the bits of EOR 80 and DOR 90, in other embodiments, the reset signal may be coupled to logic, the output of which may be used to override the software hint values. Upon a context switch, the values thus present in the registers as affected by the hardware override of the software hints may be saved.

Embodiments of the present invention thus enable dynamic configuration of processor features. Furthermore, in various embodiments of the present invention OS privilege is not needed to enable or disable processor features, allowing fast access, and facilitating fine-grained optimization of application performance with respect to various processor features, such as HWP. Thus user-level hints and/or overrides to processor configurations may be implemented, instead of restricting such management to the OS and BIOS for all processes. Accordingly, an application program can dynamically configure one or more processor features, and do so only for that program. Other processor features can be controlled using software override hints, such as branch prediction logic and the like. For example, branch prediction may be enabled during certain program phases and disabled during other phases. Still other features may include features such as dynamic random access memory (DRAM) page open/close policies, cache allocation policies, bus protocols, other memory protocols, and the like.

Figure 5:
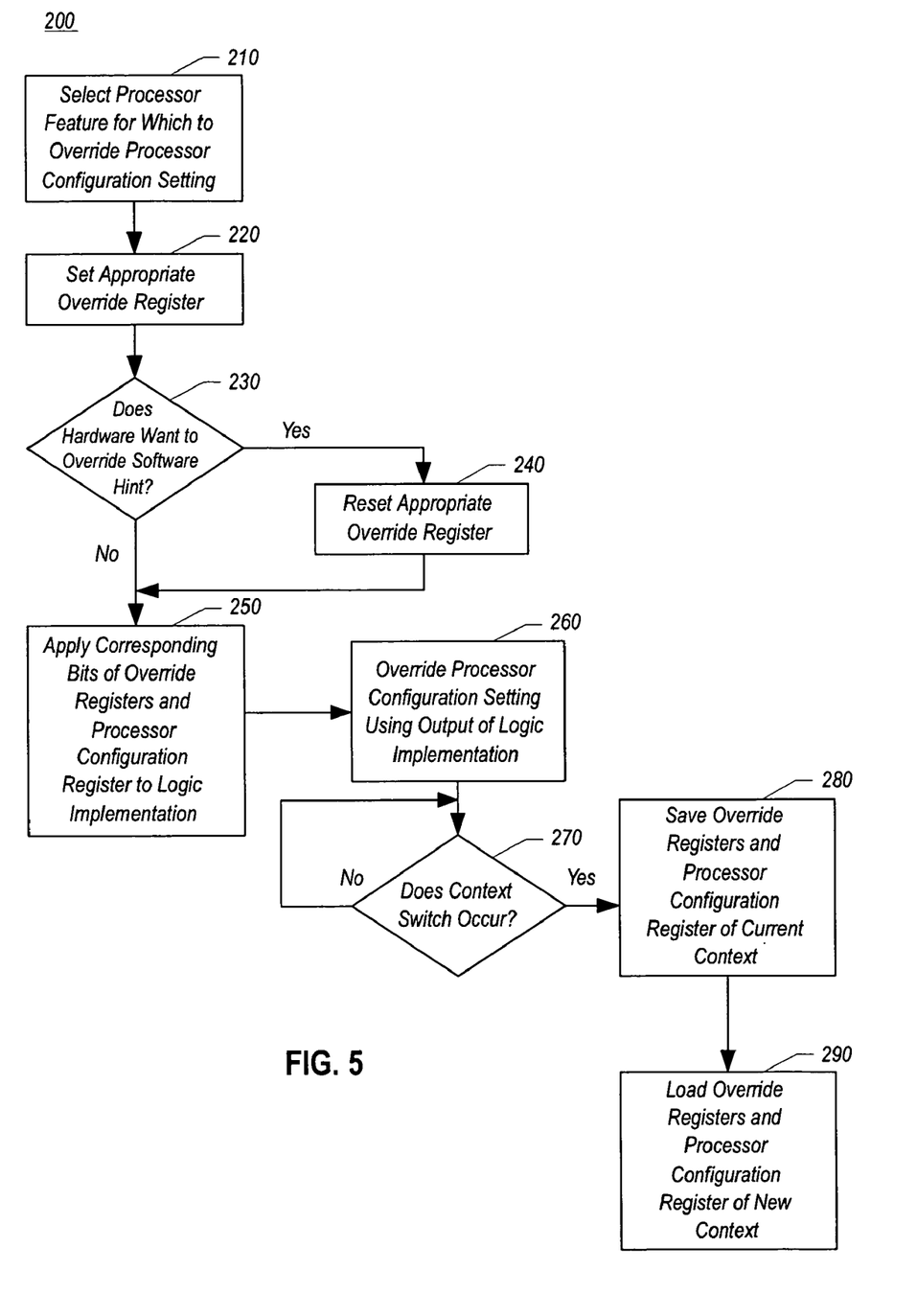
FIG. 5 is a flow diagram of a method according to one embodiment of the present invention.

Referring now to FIG. 5, shown is a flow diagram of a method according to one embodiment of the present invention. As shown in FIG. 5, method 200 may be performed by software to override a desired processor feature. At block 210, the processor feature to be overridden may be selected. Then, in an implementation incorporating one or more override registers, the appropriate override register may be set (block 220). For example, with reference to the implementation of FIG. 3, to enable a processor feature that is disabled by default (e.g., PCR 70 has a corresponding bit value of 0), EOR 80 may have its corresponding bit set to a value of 1.

Then in an embodiment in which hardware may choose to override such a software hint value, next it may be determined whether the hardware wants to override the software hint (diamond 230). If so, the appropriate override register (in this case, EOR 80) may be reset (block 240), and control may pass to block 250. If the hardware chooses not to override the software hint, control may pass directly to block 250 from diamond 230.

Corresponding bits of the override registers and the processor configuration register then may be applied to a logic implementation (block 250). For example, with reference to FIG. 3, corresponding bits of PCR 70 and EOR 80 may be applied to OR gate 92, the output of which may be applied to AND gate 94 along with the corresponding bit of DOR 90. Based on the output of AND gate 94, the processor configuration setting may be overridden using the output of the logic implementation (block 260).

The above operation to override a processor configuration setting may be performed during a first context of a program. For example, the first context may correspond to a software thread, such as a GC phase of a program. Next it may be determined whether a context switch occurs (diamond 270). For example, a context switch may occur at the end of the GC phase of the program. If a context switch does not occur, control may loop back to diamond 270.

Upon a context switch, the values in the override registers and the processor configuration register may be saved (block 280). For example, such values may be saved along with the values in other context registers to allow for restoring of the processor state values on a later context switch back to the original context.

After the context switch, the override registers and processor configuration register may be loaded with values for the new context (block 290). For example, if such context was previously active, the values saved away with the processor state may be restored.

Embodiments may be implemented in a computer program that may be stored on a storage medium having instructions to program a computer system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

Figure 6:
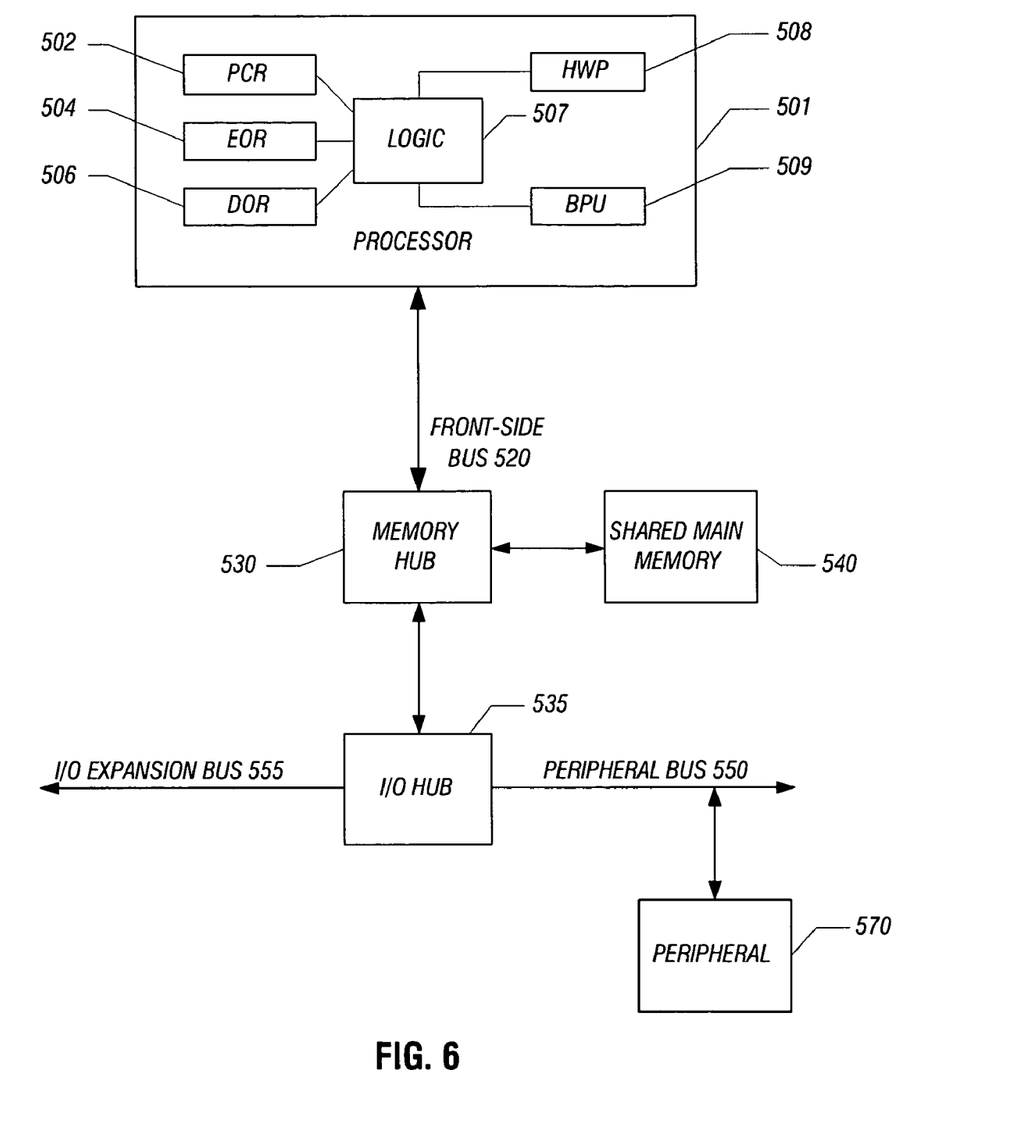
FIG. 6 is a block diagram of a representative computer system in accordance with one embodiment of the present invention.

Referring now to FIG. 6, shown is a block diagram of a computer system in accordance with one embodiment of the present invention. As shown in FIG. 6, the computer system includes a processor 501. Processor 501 may be coupled over a front-side bus 520 to a memory hub 530 in one embodiment, which may be coupled to a shared main memory 540 via a memory bus. Processor 501 may include various registers in accordance with an embodiment of the present invention. Specifically, as shown in FIG. 6, processor 501 may include a processor configuration register (PCR) 502, an enable override register (EOR) 504, and a disable override register (DOR) 506. The corresponding bits in each of these registers may be coupled to logic 507 which may be used to logically combine the bits to override a processor configuration setting for a given processor feature. As shown in FIG. 6, logic 507 may be coupled to various processor resources, for example, a HWP 508 and a branch prediction unit (BPU) 509. Based on the output of logic 507, these processor features may be enabled or disabled. As discussed above, such feature selection may be under user control.

Memory hub 530 may also be coupled (via a hub link) to an input/output (I/O) hub 535 that is coupled to an I/O expansion bus 555 and a peripheral bus 550. In various embodiments, I/O expansion bus 555 may be coupled to various I/O devices such as a keyboard and mouse, among other devices. Peripheral bus 550 may be coupled to various components such as a peripheral device 570 which may be a memory device such as a flash memory, add-in card, and the like. Although the description makes reference to specific components of the system of FIG. 6, numerous modifications of the illustrated embodiments may be possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a first register to store first override information to override a default setting for at least one processor feature;
   a processor configuration register to store the default setting for the at least one processor feature;
   a second register to store second override information to override the default setting for the at least one processor feature;
   a first logic to couple corresponding entries of the processor configuration register and the first register; and
   a second logic to couple an output of the first logic with a corresponding entry of the second register.

2. The apparatus of claim 1, wherein the first register and the second register to store the first override information and the second override information, respectively, under user level software.

3. The apparatus of claim 1, wherein the first register to override an enabled state of the at least one processor feature and the second register to override a disabled state of the at least one processor feature.

* * * * *